United States Patent [19]

Held

[11] Patent Number: 4,584,106

[45] Date of Patent: Apr. 22, 1986

[54] CHLORINATOR AND METHOD

[76] Inventor: Wayne L. Held, 28011 Paseo Barranca, San Juan Capistrano, Calif. 92675

[21] Appl. No.: 639,718

[22] Filed: Aug. 13, 1984

[51] Int. Cl.$^4$ .............................................. C02F 1/76
[52] U.S. Cl. .................................... 210/754; 137/268; 210/169; 210/206; 422/264; 422/278
[58] Field of Search ........................... 137/101.11, 268; 210/754–756, 169, 206; 422/264, 274, 278, 282

[56] References Cited

U.S. PATENT DOCUMENTS

| | | | |
|---|---|---|---|
| 1,409,248 | 3/1922 | Sevcik | 422/274 |
| 3,203,440 | 8/1965 | Schneider | 422/264 |
| 3,474,817 | 10/1969 | Bates et al. | 210/169 |
| 3,595,395 | 7/1971 | Lorenzen | 210/169 |
| 4,199,001 | 4/1980 | Kratz | 422/264 |
| 4,260,587 | 4/1981 | Braden | 422/282 |
| 4,293,425 | 10/1981 | Price | 210/754 |
| 4,339,332 | 7/1982 | Jasperson | 422/278 |

FOREIGN PATENT DOCUMENTS 2409790  7/1979  France ........................... 137/268

*Primary Examiner*—Peter Hruskoci
*Attorney, Agent, or Firm*—John H. Lynn

[57] ABSTRACT

A chlorination system for distributing chlorine in a hot tub or spa. The system regulates the flow of water through a mixing chamber with a valve or stopcock to control the rate of chlorine distribution. An assembly of venturis and baffles also regulates the flow of water through the mixing chamber and controls the size of particles of chlorination tablets that will flow out of the chlorination system.

11 Claims, 4 Drawing Figures

U.S. Patent
Apr. 22, 1986
4,584,106
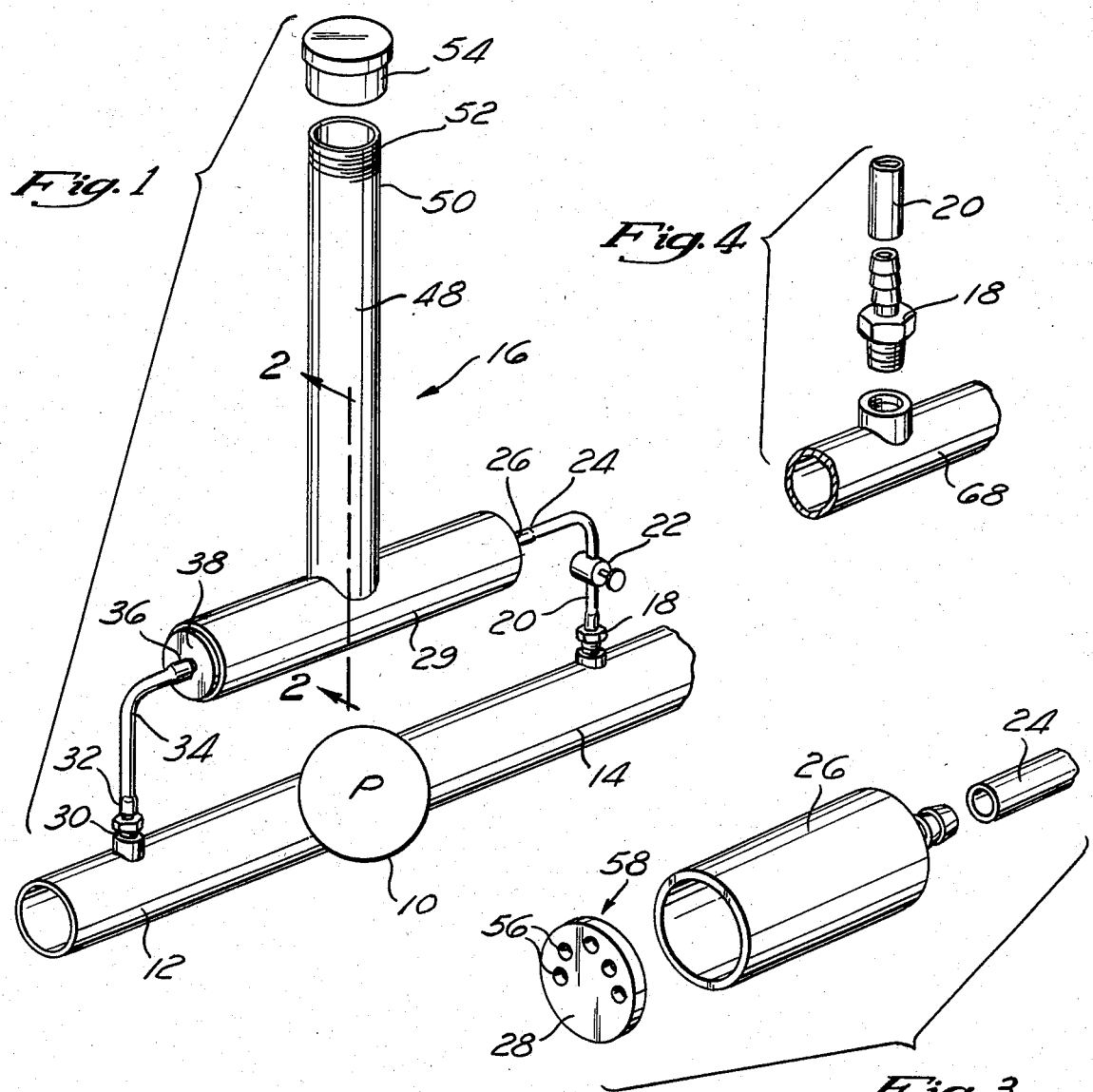
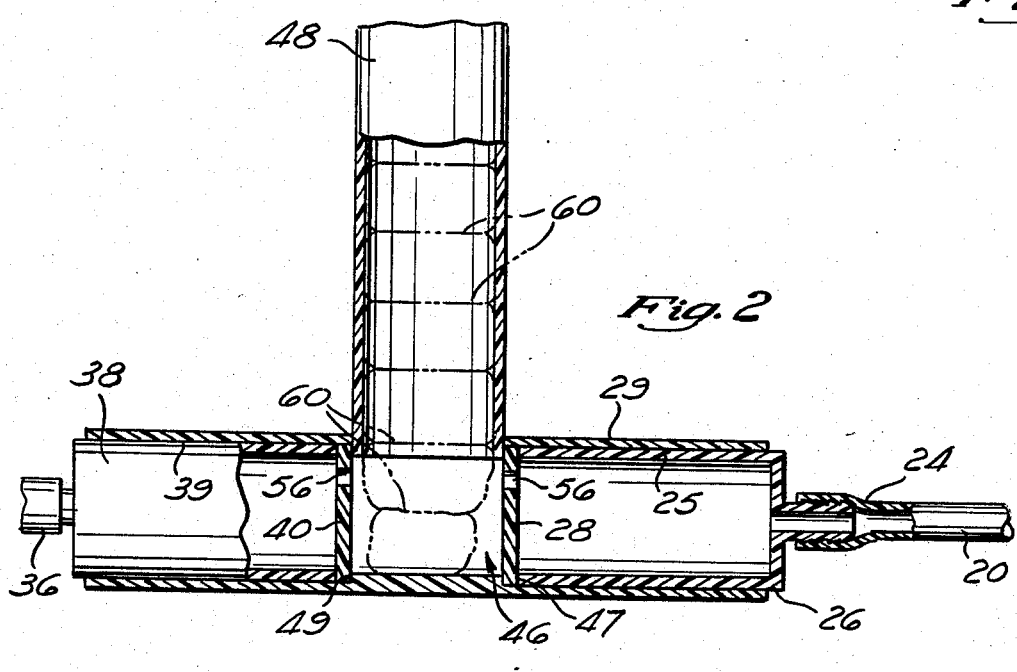

CHLORINATOR AND METHOD

BACKGROUND OF THE INVENTION

This invention relates generally to plumbing and chemical dispensing apparatus and methods and particularly to apparatus and methods for dispensing water purification chemicals. Still more particularly, this invention relates to apparatus and methods for distributing chlorine containing compounds into a hot tub, spa or the like.

It is well known that in order to prevent growth of algae and harmful or undesirable bacteria in a hot tub, spa or the like, it is necessary to regularly treat the water in such devices with chlorine. Because of the relatively large volumes of water required to fill an ordinary hot tub, it is wasteful, costly and time consuming to empty and refill the tube for each use. As used herein, the term "hot tub" will be understood to include hot tubs formed of wood, plastic, fiberglass and in general any enclosure for containing heated water in which individuals may place themselves for recreational and theraputic purposes. The amount of chlorine required depends upon the amount of use to which the hot tub is subjected and the material that is in contact with the water. For example, a wooden hot tub is more conducive to growth of contaminants than fiberglass, plastic and concrete.

Hot tubs have become very popular in certain regions of the United States for recreational purposes and have been found to have beneficial theraputic effects because of the soothing effects of the application of heat to sore muscles and joints. There have been efforts made to provide chlorination systems for maintaining a desired amount of chlorine in such devices. The simplest chlorination method is to manually place a desired amount of a water soluble chemical that includes chlorine into the hot tub. The chemical may be in either powdered, granular, or tablet form. Manually chlorinating a hot tub or spa is inconvenient and insufficient to provide the preferred amount of chlorination over extended time periods. Manual addition of chlorine usually results in overchlorination, causing an unpleasant odor and undesired bleaching of the hair of a person using the hot tub. In manual methods, chlorine is usually not added until the chlorine concentration has fallen below the amount required to prevent the undesirable contamination of the water. Therefore, manual chlorination of the water in a hot tub results in alternate over chlorination and under chlorination.

The chemical commonly used in hot tub chlorination is sold in tablets formed as cylinders having a diameter of about 1 inch and a height of about 0.7 inch. There are chlorinator devices that dispense such tablets; however, prior chlorinator devices are expensive, inconvenient to use and require frequent attention to provide the desired amount of chlorination.

Accordingly there is a need in the art for a chlorination system for a hot tub that dispenses a predetermined amount of chlorine over an extended period of time to maintain the water in the hot tub in an essentially constant state of chlorination.

SUMMARY OF THE INVENTION

This invention provides a chlorination system and method with which specifically overcomes and alleviates the deficiencies of previous chlorination systems.

The invention includes a chlorination tube having one end in fluid communication with a piping or tubing system that is connected between the inlet and outlet of the pump that circulates the water between the hot tube and a heater. Conventional chlorination tablets are placed in the chlorination tube and the pump forces water past the end of the tube to gradually dissolve the chlorination tablets into the hot tube water.

The invention preferably includes a mixing chamber, a venturi on each side of the mixing chamber and a pair of baffles to regulate the flow of water through the mixer. The invention further preferably includes a valve or stopcock positioned between the pump outlet and the mixer chamber so that the flow of water through the mixer chamber may be interrupted to place additional chlorination tablets in the chlorination tube.

The components of the chlorination system are preferably formed of ABS plastic and may easily be installed by an individual having some familiarity with basic tools such as drills, wrenches and dies but having a relatively low level of skill in the plumbing arts as would, for example, an average "do-it-yourself" homeowner.

BRIEF DESCRIPTION OF THE DRAWINGS

FIG. 1 is a perspective view of a chlorination system according to the invention;

FIG. 2 is a partial cross-sectional view of the chlorination tube, venturis, dispenser body, and mixing chamber of FIG. 1;

FIG. 3 is an exploded perspective view of a venturi and a baffle mounted in the chlorinator body of FIGS. 1 and 2; and FIG. 4 illustrates connection of the chlorinator system to a pipe.

DESCRIPTION OF THE PREFERRED EMBODIMENT

Referring to FIG. 1, there is shown a pump 10 having an inlet pipe 12 and an outlet pipe 14. Operation of the pump 10 forces water through the outlet pipe 14 into a hot tub or spa (not shown) and forces water from the hot tub into the inlet pipe 12 to the pump 10 for recirculation through the hot tub. Conventional hot tubs and spas have such a pump in order to pump water from the hot tub to a heating device (not shown) to maintain the water in the hot tub at a predetermined temperature, which typically ranges from 100 to 105 degres Fehrenheit. The inlet pipe 12 and the outlet pipe 14 may be made of either metal or a plastic material, such as ABS or polyvinylchloride.

FIG. 1 illustrates a chlorination dispensing system 16 connected between the inlet pipe 12 and the outlet pipe 14. The chlorination dispensing system 16 comprises a male hose barb 18 extending from the outlet pipe 14 to provide pressurized water to a tube 20 at an end 22. The tube 20 preferably includes a flow control device, such as a stopcock 22 therein as best shown in FIG. 1. The tube 20 has an end 24 connected to a right venturi 26 mounted inside a venturi chamber 25, which terminates at a baffle 28 positioned inside a dispenser body 29. A second male hose barb 30 extends from the inlet pipe 12 for connection to an end 32 of a tube 34. The tube 34 has an end 36 connected to a left venturi 38 mounted in a venturi chamber 39, which terminates at a baffle 40, which is also inside the dispenser body 29.

Referring to FIG. 2, the dispenser body 29 includes a mixing chamber 46 positioned between the venturis 26 and 38. A chlorinator tube 48 extends from the mixing chamber 46 in fluid communication therewith. Although it is not essential to the operation of the invention, the chlorinator tube 48 is preferably vertically aligned. The chlorinator tube 48 has an end 50 that preferably has male threads 52 formed thereon for receiving a female threaded lid 54.

Referring to FIG. 2, the mixing chamber 46 has an inside diameter that is less than the inside diameter of the venturi chambers 25 and 39, which receive the venturis 26 and 38, respectively. The dispenser body 29 has a generally cylindrical configuration with an outside diameter of approximately 1¼ inch and an inside diameter of approximately 1⅛ inch. The inside diameter of the mixing chamber 46 is approximately 1 inch so that the junctures of the mixing chamber 46 and the venturi chambers 25 and 39 form a pair of lips 47 and 49, respectively, that project about 1/16 inch radially inward from the inner diameters of the venturi chambers 25 and 39.

When the chlorination system 16 is fully assembled as shown in FIG. 1, the baffle 28 illustrated in FIGS. 2 and 3 is placed inside each of the venturi chambers 25 and 39 against the lips 47 and 49. The venturis 26 and 38 are then inserted into the venturi chambers 25 and 39, respectively. Since the outer diameters of the venturis 26 and 38 are each approximately 1⅛ inch, the same as the inner diameter of the venturi chambers, the venturis 26 and 38, respectively, when secured in position in their respective chambers 25 and 39 abutting the baffles 28 and 40, maintain the baffles 28 against the lips 47 and 49 as shown in FIG. 2. Therefore, any water that passes between the venturis 26 and 38 through the mixing chamber 46 must pass through both baffles 28.

As shown in FIG. 3, each baffle 28 preferably contains a plurality of orifices 56, which are preferably about ⅛ inch in diameter. Although not essential to the operation of the system 16, the orifices 56 are preferably angularly spaced along an arc in a generally semi-cylindrical portion 58 of the baffle 28. The baffles 28 are substantially identical preferably positioned in the venturi chambers 25 and 39 so that the orifices 50 are adjacent the end of the chlorinator tube 48 that connects to the chlorinator body 29. It has been found that having the baffles 28, 40 positioned with the orifices adjacent the chlorinator tube 48 is less likely to result in clogging of the orifices 56 with particulate matter than if the orifices 56 were positioned opposite the end of the chlorinator tube 48 at the lower portion of the mixing chamber 46.

In adition, having the orifices 56 arranged in an arc as shown in FIG. 3 and positioned in the preferred arrangement described hereinabove, causes the water depth in the mixing chamber 46 to be at least as great as the distance from the lower inner edge portion of the mixing chamber 46 to the lowermost baffle orifices 50. The hose barbs 18 and 30 each preferably have an inside diameter of about ¼ inch; therefore, it is undesirable to have particles having any dimension larger than ¼ inch travel from the mixing chamber 46 to the hose barbs 30. The baffle orifices 56, therefore, regulate the rate of flow through the mixing chamber 46, regulate the depth of water in the mixing chamber 46 and regulate the particle size which will flow through the mixing chamber 46.

Referring again to FIG. 2, the chlorinator tube 48 may be integrally formed of one piece or it may be formed of two sections (not shown). The length of the chlorinator tube 48 may be any desired value depending upon the particular application. A preferred embodiment of the system 16 has a chlorinator tube 48 which is approximately 16 inches long with an outer diameter of approximately 1¼ inch and an inner diameter of approximately 1⅛ inch. This chlorinator tube 16 will hold approximately 24 standard sized 1 inch diameter chlorination tablets 60, which will generally be adequate to maintain a desired chlorination level in a typical wooden hot tub for approximately one month. Regulation of the chlorination rate is accomplished by adjusting the stopcock 22 to control the rate at which the pump 10 forces water through the chlorination system 16.

When in use to chlorinate a hot tub, the chlorination system 16 receives a small portion of the water pumped out of the pump 10 into the outlet 14. Even if the stopcock 22 were completely opened, only a small fraction of the water output of the pump 10 would circulate through the chlorination system 16 because the diameters of the hose barbs 18 and 30 are preferably only about ¼ inch whereas the typical inside diameter of the inlet pipe 12 and the outlet pipe 14 is about 1½ to 2 inch. Water enters the right venturi 26 and passes through the first baffle 28. After passing through the baffle 28, water enters the mixing chamber 46 wherein chlorination tablets 60 adjacent the lower end of the chlorination tube 48 are positioned. Dissolved chlorine and particles of the chlorine tablets having their largest dimension less than the ⅛ inch diameter of the baffle orifices 50 pass out of the mixing chamber 46 into the left venturi 38, through the tube 34 and the hose barb 30 into the inlet 12. Water entering the inlet 12 through the hose barb 30 has a higher degree of chlorine concentration than water passing to the inlet 12 directly from the hot tub. Although a small quanitity of the newly chlorinated water will be recirculated through the chlorinator 16, most of the chlorine introduced into the water will bypass the hose barb 18 and continue through the outlet 14 for input to the hot tub.

FIG. 4 illustrates a second method of connecting the chlorination system 16 to the inlet and outlet pipes 12 and 14. The pipes may have a T-shaped section 68 inserted therein; and the hose barb may provide fluid communication between the tube 20 and the pipe.

Installation of the chlorination system 16 first involves closing the pump inelt 13 and outlet valves (not shown) if the pump 10 includes such valves so that the remaining installation steps may proceed without interference from water. The pump 10, which will ordinarily be an electrically powered pump, should be turned off. In order to install the hose barbs 18 and 30 having the dimensions of the preferred embodiment, a pair of holes 62, 64 drilled with an 11/32 inch diameter drill bit should be drilled in the inlet pipe 12 and the outlet pipe 14, with each hole 62, 64 being about 1 foot away from the pump 10. The holes 62, 64 should be drilled so that they are essentially parallel, and both holes 62, 64 should be tapped with a ⅛ inch pipe tap to form threads therein. The threaded ends of the hose barbs 18 and 30 should be wrapped with a sealing tape, preferably formed of a material such as Teflon, a trademark of E.I. DuPont Nemours Company, before the hose barbs 18, 30, respectively, are screwed into the threaded holes. The length of the plastic tubes 20 and 34 should be chosen so that the chlorinator body 29 will be above the water level in the hot tub or spa to be chlorinated.

The baffles 28 are positioned in the chlorinator body 29 against the lips 47, 49 and the venturi chambers 25, 39 should have a small quantity of a suitable glue, solvent or cement placed therein for sealing the larger outer diameter portion of the venturis 26, 38, respective to the venturi chambers 25, 29.

The hose barbs 18, 30 are preferably formed of ABS; and the tubes 20 and 34 are connected to the hose barbs 18 and 30, respectively, by a suitable cement, solvent or glue. After the connections are secure, the pump inlet and outlet valves respectively, should be opened; and the pump 10 should be turned on. The stopcock 22 is then adjusted to provide the desired amount of chlorine to the hot tub. Adjustment of the chlorine dispensing rate is usually done by a trial and error process. If the water in the hot tub begins to have an unpleasing chlorine odor, then the rate of the chlorine distribution should be reduced by adjusting the stopcock 22 to restrict the rate of flow of water through the chlorinator system 16. If it is believed that the rate of chlorination is insufficient, then the stopcock 22 should be adjusted to increase the rate of flow through the chlorinator 16.

Although the present invention has been described with reference to a particular embodiment thereof, it will be understood by those skilled in the art that numerous modifications may be made without departing from the scope of the invention. Although the invention is described with reference to a hot tub or spa, the chlorinator system 16 may also be used to chlorinate swimming pools and fountains. Accordingly, all modifications and equivalents which are properly within the scope of the appended claims are included in the present invention.

What is claimed is:

1. A chlorination dispensing system for connection to inlet and outlet pipes of a pump for circulating water through a hot tub, pool or the like, comprising:
   a dispenser body including a mixing chamber therein, the mixing chamber having an inlet and an outlet;
   flow control means for controlling fluid flow through the mixing chamber including an inlet venturi chamber and an outlet venturi chamber, the mixing chamber being positioned between the inlet and outlet venturi chambers within the dispensing body, an inlet venturi mounted in the inlet venturi chamber and an outlet venturi mounted in the outlet venturi chamber;
   a chlorinator tube having one end in fluid communication with the mixing chamber, the chlorinator tube being formed to hold chlorine-containing tablets such that water in the mixing chamber dissolves the tablets to form a chlorine solution;
   means for diverting a portion of pressurized water from the pump outlet pipe to the mixing chamber inlet such that all of the diverted water passes through the mixing chamber to dissolve the tablets;
   a first baffle mounted in the mixing chamber outlet, the first baffle having a plurality of angularly spaced orifices therein;
   a second baffle mounted in the mixing chamber inlet, the second baffle having a plurality of angularly spaced orifices therein; the first and second baffles being positioned such that the orifices regulate the water depth in the mixing chamber; and
   means for introducing chlorinated water from the mixing chamber outlet into the pump inlet pipe.

2. The system of claim 1 wherein the first baffle comprises a generally cylindrical body having a plurality of axially aligned passages therethrough having diameters chosen to permit only particulate matter having a predetermined maximum dimension to pass through the system to the introducing means for input to the pump inlet.

3. The system of claim 1 wherein the means for providing chlorine-containing tablets to the mixing chamber includes an elongate generally cylindrical chlorinator tube having a central passage in communication with the mixing chamber such that a portion of chlorine-containing tablets placed in the chlorinator tube will be dissolved by water in the mixing chamber.

4. The system of claim 1 wherein the diverting means includes:
   a first hose barb extending into the pump outlet pipe;
   a tube connected between the first hose barb and the inlet venturi; and
   valve means for regulating the flow of water through the first hose.

5. The system of claim 4 wherein the introducing means includes:
   a second hose barb extending into the pump inlet pipe; and
   a second tube connected between the outlet venturi and the second hose barb.

6. The system of claim 1 wherein each of the baffles comprises a generally cylindrical structure divided into a first portion containing the orifices and a second portion having no orifices, each baffle being mounted in the mixing chamber inlet such that the first portion is above the second portion.

7. A method for dispensing chlorine to an outlet pipe of a pump for circulating water through a hot tub, pool or the like, comprising:
   forming a dispenser body including a mixing chamber therein with an inlet and an outlet:
   forming a flow control means for controlling fluid flow through the mixing chamber including an inlet venturi chamber and an outlet venturi chamber, the mixing chamber being positioned between the inlet and outlet venturi chambers within the dispensing body; an inlet venturi mounted in the inlet venturi chamber, and an outlet venturi mounted in the outlet venturi chamber connecting a chlorinator tube to have one end in fluid communication with the mixing chamber such that water in the mixing chamber dissolves chlorine-containing tablets in the chlorinator tube to form a chlorine solution;
   diverting a portion of pressurized water from the pump outlet to the mixing chamber inlet such that all of the diverted water passes through the mixing chamber to dissolve the tablets;
   controlling fluid flow through the mixing chamber using said flow control means and by mounting a first baffle in the mixing chamber outlet and a second baffle in the mixing chamber inlet:
   forming the baffles to each have a plurality of angularly spaced orifices therein for regulating the rate of water flow through the mixing chamber and for regulating the water depth in the mixing chamber; and
   introducing chlorinated water from the mixing chamber outlet into the pump inlet pipe.

8. The method of claim 7 further including the step of forming a plurality of axially aligned passages through the first baffle having diameters chosen to permit only particulate matter having a predetermined maximum dimension to pass therethrough for input to the pump inlet.

9. The method of claim 7 further including the step of mounting an elongate generally cylindrical chlorinator tube having a central passage in communication with the mixing chamber such that a portion of chlorine-containing tablets placed in the chlorinator tube will be dissolved in the mixing chamber.

10. The method of claim 7 further including the steps of:
   extending a first hose barb into the pump outlet pipe;
   connecting a tube between the first hose barb and the inlet venturi;
   regulating the flow of water through the first hose with a valve;
   extending a second hose barb into the pump inlet pipe; and
   connecting a second tube between the outlet venturi and the second hose barb.

11. The method of claim 7, further including the steps of:
   forming each baffle as a generally cylindrical structure;
   forming the orifices in a first portion of the generally cylindrical structure while forming no orifices in a second portion thereof; and
   mounting each baffle in the mixing chamber inlet such that the first portion is above the second portion.

* * * * *